US012622842B1

(12) United States Patent
Chen

(10) Patent No.: US 12,622,842 B1
(45) Date of Patent: May 12, 2026

(54) VIBRATION MASSAGER

(71) Applicant: UC GLOBAL TRADE INC., Chino, CA (US)

(72) Inventor: Junjun Chen, Shenzhen (CN)

(73) Assignee: UC GLOBAL TRADE INC.

( * ) Notice: Subject to any disclaimer, the term of this patent is extended or adjusted under 35 U.S.C. 154(b) by 0 days.

(21) Appl. No.: 19/381,050

(22) Filed: Nov. 6, 2025

(30) Foreign Application Priority Data

Sep. 29, 2025 (CN) ......................... 202511425222.2

(51) Int. Cl.

*A61H 19/00* (2006.01)
*A61H 23/02* (2006.01)
*A61H 39/04* (2006.01)

(52) U.S. Cl.

CPC ............. *A61H 19/40* (2013.01); *A61H 23/02* (2013.01); *A61H 2201/1695* (2013.01); *A61H 2201/5097* (2013.01)

(58) Field of Classification Search

CPC .................... A61H 19/40; A61H 23/02; A61H 2201/1695; A61H 2201/5097; A61H 39/04; A61H 23/006; A61H 2023/002; A61H 2023/0209; A61H 23/0254; A61H 23/0263; A61H 2023/0281; A61H 2023/0272; A61H 2023/029; A61H 2201/501; A61H 2201/5002; A61H 2201/5005; A61H 2201/5007; A61H 2201/5015; A61H 2201/5012; A61H 2201/50; A61H 2201/5048; A61H 2201/5035; A61H 2201/5038; A61H 2201/5023; A61H 21/00; A61H 19/00; A61H 19/30; A61H 19/32; A61H 19/34; A61H 19/44;

(Continued)

(56) References Cited

U.S. PATENT DOCUMENTS 8,657,766 B2 * 2/2014 Tuck ...................... A61H 19/44 600/38
12,213,931 B1 * 2/2025 Wu ........................ A61H 19/44

(Continued)

FOREIGN PATENT DOCUMENTS

CN 206381366 U 8/2017
CN 213941431 U 8/2021

(Continued)

*Primary Examiner* — Brian L Casler

(74) *Attorney, Agent, or Firm* — Ming Jiang; OPENPTO US LLC

(57) ABSTRACT

A vibration massager includes a rod body, and the rod body is connected to at least a first stimulation head and a second stimulation head, where cross-sectional areas of the first stimulation head and the second stimulation head are larger than a cross-sectional area of the rod body, and at least one of the first stimulation head and the second stimulation head is provided with a vibration device. By arranging the first stimulation head and the second stimulation head on the rod body, and arranging an independent vibration device in either of the stimulation heads, the present disclosure enriches the sense of hierarchy, sense of space, and variations of vibration stimulation, acts on a wider area in an inner cavity or two different sensitive points simultaneously, and provides a more comprehensive, more dynamic, and more variable sensory experience than a single vibration source.

18 Claims, 4 Drawing Sheets

(58) Field of Classification Search
CPC ...... A61H 2205/087; A61H 2201/1692; A61H 2201/1683; A61H 2205/00; G16H 20/30; G16H 40/67; A63B 2071/0625; A63B 71/0622
USPC ........................................................... 600/38
See application file for complete search history.

(56) References Cited

U.S. PATENT DOCUMENTS

| | | | | |
|---|---|---|---|---|
| 2012/0215141 | A1* | 8/2012 | Peddicord | A61N 1/0524 600/38 |
| 2014/0288364 | A1* | 9/2014 | St. Bernard | A61H 19/34 601/48 |
| 2016/0000642 | A1* | 1/2016 | Zipper | A61H 19/34 600/38 |

FOREIGN PATENT DOCUMENTS

| | | | | |
|---|---|---|---|---|
| DE | 202006009826 | U1 * | 9/2006 | A61H 19/44 |
| DE | 202025100680 | U1 * | 3/2025 | A61H 23/0254 |
| RU | 2509548 | C2 * | 3/2014 | A61H 19/30 |
| WO | WO-2019177499 | A1 * | 9/2019 | A61H 19/00 |
| WO | WO-2022040263 | A1 * | 2/2022 | A61H 19/50 |
| WO | WO-2025124612 | A1 * | 6/2025 | A61H 7/002 |

* cited by examiner

VIBRATION MASSAGER

CROSS-REFERENCE OF RELATED APPLICATION

The present application claims priority to Chinese Patent Application No. 202511425222.2 filed on Sep. 29, 2025, which is incorporated herein by reference in its entirety.

TECHNICAL FIELD

The present disclosure belongs to the technical field of massagers, and specifically relates to an insertable vibration massager for stimulating local body parts of the user.

BACKGROUND

As a healthcare electrical appliance, a vibration massager generates a mechanical vibration through an internally integrated vibration source (such as an eccentric wheel vibration motor or a linear vibration motor) and transmits the vibration to a body part of the user in contact with the vibration massager. The user uses the vibration massager to stimulate sensitive areas of the body to obtain a sense of pleasure.

However, an insertable vibration massager in the prior art has typical design defects: A vibration device is disposed only at a top end of the vibration massager. A fixed position of the vibration source, and a single vibration mode, result in the failure to achieve composite stimulation with dynamic changes in both spatial positions and vibration parameters; and the vibration generated by a single-point vibration source only covers a limited area of contact with a cavity-like area (such as the vagina or anus), such that it is difficult to simultaneously stimulate a plurality of target sensitive points in an inner cavity, effectively vibrate two or more spatially separated target areas in the cavity simultaneously, and provide a composite stimulation experience with the spatial hierarchy (such as differences in stimulation intensities at different depths and radial positions of the inner cavity) and rich changes (such as dynamic switching in vibration frequencies and amplitudes, or a synergistic effect of multi-point vibrations).

SUMMARY

In order to solve the above technical problems, the present disclosure provides a vibration massager.

In order to achieve the above objectives, the present disclosure adopts the following technical solutions:

A vibration massager is provided, including:

a rod body;

cross-sectional areas of the first stimulation head and the second stimulation head are larger than a cross-sectional area of the rod body; and at least one of the first stimulation head and the second stimulation head is internally provided with a vibration device.

Preferably, either of the stimulation heads includes:

a massage head, and a connecting neck configured to connect the massage head and the rod body;

where the connecting neck has a bending curvature.

Preferably, the connecting neck is provided with an extension segment along a circumferential wall surface of the massage head, and the extension segment is integrally formed with the circumferential wall surface of the massage head.

Preferably, the extension segment protrudes from the circumferential wall surface of the massage head.

Preferably, a maximum cross-sectional dimension of the rod body ranges from 5 mm to 30 mm.

Preferably, the first stimulation head and the second stimulation head are spherical bodies.

Preferably, the rod body is provided with a cavity; and and an elastic support member is disposed in the cavity.

Preferably, the rod body is a straight rod or a curved rod.

Preferably, the vibration massager includes:

a base connected to the rod body, where an end face of the base connected to the rod body is provided with:

a massage structure, where the massage structure is configured to perform stimulation massage on an in vitro target massage area.

Preferably, the massage structure is a massage protrusion protruding from the end face of the base.

Preferably, the base is in a ship shape or a lip shape.

Preferably, circumferential wall surfaces of the first stimulation head and the second stimulation head are provided with:

stimulation protrusions, where the stimulation protrusions protrude from the circumferential wall surfaces of the first stimulation head and the second stimulation head.

Preferably, a length of the rod body ranges from 80 mm to 150 mm.

Preferably, the rod body is provided with:

a first end portion and a second end portion;

where the first end portion is connected to the base in an integrally formed manner; and where the second end portion is connected to the first stimulation head and forms the connecting neck of the first stimulation head.

Preferably, a diameter of the first end portion is larger than a diameter of the remaining main body portion of the rod body.

Preferably, diameters of the first stimulation head and the second stimulation head range from 10 mm to 35 mm.

Preferably, the vibration massager includes:

an electronic control module electrically connected to a first vibration device located in the first stimulation head and/or a second vibration device located in the second stimulation head;

where the electronic control module is configured to independently control at least one vibration parameter of the first vibration device and/or the second vibration device; and the vibration parameter includes: start or stop, a vibration intensity, and a vibration frequency.

Preferably, the vibration massager includes:

a communication module, configured to establish a wireless communication connection with an electronic device and receive an audio signal sent by the electronic device;

where the electronic control module is configured to respond to the audio signal so as to independently control at least one vibration parameter of the first vibration device and/or the second vibration device; and the vibration parameter includes: start or stop, a vibration intensity, and a vibration frequency.

Preferably, the electronic control module is configured to control at least one vibration parameter of the first vibration device and/or the second vibration device according to an amplitude or frequency characteristic of the audio signal;

where when the amplitude or frequency characteristic is enhanced, the vibration parameter is synchronously enhanced or weakened; and the vibration parameter is selected from: start or stop, a vibration intensity, and a vibration frequency.

Preferably, when both the first stimulation head and the second stimulation head are internally provided with the vibration device, the electronic control module controls the first vibration device and the second vibration device to perform alternate vibrations according to a rhythm of the audio signal.

Preferably, the audio signal includes:

an audio file stored locally in the electronic device;

and/or a network streaming audio received and played by an application program.

Preferably, the audio signal includes an audio input collected by a microphone of the electronic device in real time, and the audio input includes a voice of the user.

The present disclosure provides a vibration massager, which has the following beneficial effects:

By arranging the first stimulation head and the second stimulation head on the rod body, and arranging an independent vibration device in either of the stimulation heads, the present disclosure achieves the vibrations of two sensitive points at different frequencies, amplitudes or predetermined modes, or achieves synergistic operations synchronously or asynchronously. The present disclosure enriches the sense of hierarchy, sense of space, and variations of vibration stimulation, acts on a wider area in an inner cavity or two different sensitive points simultaneously, and provides a more comprehensive, more dynamic, and more variable sensory experience than a single vibration source (for example, the present disclosure achieves the vibration stimulation simultaneously or alternately at different depths and positions, and achieves changes in various vibration parameter combinations), thereby effectively solving the problems of single stimulation modes and monotonous effects in the prior art.

REFERENCE NUMERALS IN THE FIGURES

1-base; 101-massage structure; 2-rod body; 201-first end portion; 202-second end portion; 204-cavity structure; 205-support rod; 206-wiring cavity; 301-first stimulation head; 302-second stimulation head; 401-massage head; 402-connecting neck; 4021-extension segment; 5-vibration device; 501-first vibration device; 502-second vibration device; 6-electronic control module; 7-communication module; and 8-electronic device.

DETAILED DESCRIPTION OF PREFERRED EMBODIMENTS

The technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments obtained by those of ordinary skill in the art without making creative efforts shall fall within the protection scope of the present disclosure.

Figure 1:
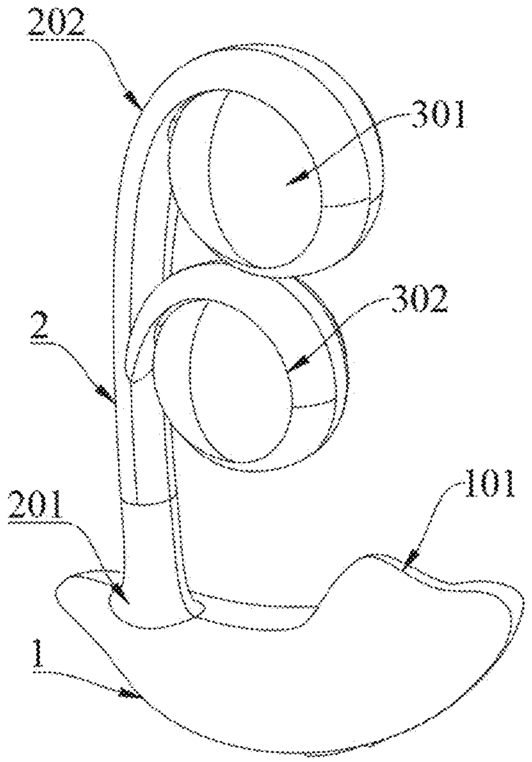
FIG. 1 is a perspective view I of a vibration massager provided by the present disclosure
Figure 2:
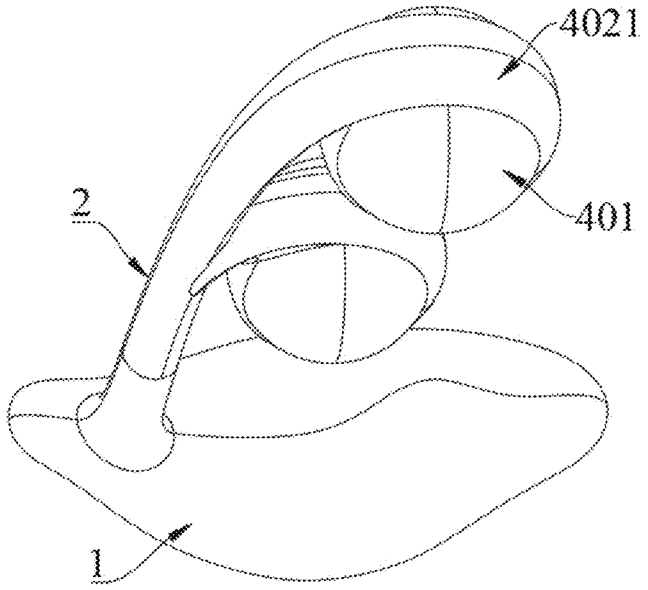
FIG. 2 is a perspective view II of a vibration massager provided by the present disclosure.

With reference to FIGS. 1 to 8, specific embodiments provided by the present disclosure are as follows:

As shown in FIGS. 1 and 2, a vibration massager is provided in this embodiment. The vibration massager may be used for massaging body parts of a user, such as cavity-like areas (including the vagina and anus). The vibration massager mainly includes a base 1, a rod body 2 connected thereto, and a stimulation structure disposed at a distal end of the rod body 2.

Specifically, the rod body 2 is a core component connecting the base 1 and the stimulation structure, and is elongated as a whole, and an effective length of an insertable portion thereof is 80 mm to 150 mm, thereby achieving effective contact with a target area.

In a specific embodiment, the rod body 2 has a non-linear structure and a curved rod structure with a certain curvature, which facilitates better fitting of a natural curve of an internal cavity of human body, such that after the vibration massager is inserted, a stimulation head at the distal end thereof comes into contact with and acts on a specific target area in an easier and more accurate manner.

To balance structural strength and use comfort, a cross-sectional shape of the rod body 2 is preferably elliptical, and a major-minor axis ratio thereof ranges from 1.1 to 1.5; and notably, the cross-sectional shape may also be circular or polygonal (such as rectangular). A cross-sectional dimension of the rod body 2 may remain constant in a length direction, or gradually increase or decrease from one end to the other end.

The rod body 2 is made of a material with predetermined flexibility, such as medical-grade silicone, and this material not only ensures that the rod body 2 stably maintains its unique curved shape when no external force is applied, but also allows elastic deformation of the rod body 2 under the action of an external force. For example, when a lateral force of 5 N is applied to the distal end of the rod body 2, a displacement thereof ranges between 5 mm and 15 mm, and plastic deformation thereof does not exceed 2% after the external force is removed.

The rod body 2 includes a first end portion 201 and a second end portion 202. The first end portion 201 is an end portion connected to the base 1, and the second end portion 202 is an end portion away from the base 1.

Specifically, the first end portion 201 is connected to the base 1, and preferably, the connection is achieved in an integrally formed manner. The first end portion 201 is used as a fixed end after the connection.

The second end portion 202 is a free end configured to connect the stimulation structure, and the second end portion 202 may undergo significant displacement or swinging under the action of an external force.

The rod body 2 is connected to the base 1 at a predetermined angle. In an embodiment, the connection is a vertical connection, that is, an included angle between the rod body 2 and the base 1 is 90°. In other embodiments, the connection is an inclined connection, and for example, the included angle may be set within a range of 30° to 70°.

In an embodiment, a cross-sectional dimension of the first end portion 201 should be larger than a cross-sectional dimension of a remaining main body portion of the rod body 2, such that the first end portion 201 and the base 1 form a stable connection, where the stable connection mentioned herein means that deformation and damage are effectively resisted when an external force is applied, such that a predetermined connection angle between the rod body 2 and the base 1 is reliably maintained.

In another embodiment, a wall thickness of the first end portion 201 is larger than a wall thickness of the remaining main body of the rod body 2, such that the rigid torque performance of connection between the first end portion 201 and the base 1 is enhanced, which also serves to maintain the predetermined connection angle between the rod body 2 and the base 1.

In yet another embodiment, both the cross-sectional dimension and the wall thickness of the first end portion 201 are larger than the cross-sectional dimension and the wall thickness of the remaining main body portion of the rod body 2.

In a specific embodiment, a maximum cross-sectional dimension of the rod body 2 ranges from 5 mm to 30 mm. Preferably, the maximum cross-sectional dimension of the rod body 2 is 10 mm.

In a specific embodiment, a length of the rod body 2 ranges from 80 mm to 150 mm.

In a specific embodiment, the included angle between the rod body 2 and the base 1 is 90°.

In a specific embodiment, to adapt to a specific application scenario, the included angle between the rod body 2 and the base 1 ranges from 30° to 70°, such as 30°, 35°, 40°, 45°, 50°, 55°, 60°, 65°, and 70°.

In a specific embodiment, to adapt to a specific application scenario, the rod body 2 has a linear structure.

In a specific embodiment, an interior of the rod body 2 constitutes a cavity structure 204. The cavity structure 204 is internally provided with an elastic support rod 205. The support rod 205 is configured to maintain the curved rod structure of the rod body 2 and endow the rod body 2 with flexibility and resilience.

Specifically, since the rod body 2 is made of a flexible material and has the cavity structure 204, its own rigidity is insufficient to resist gravity. Therefore, the internal elastic support rod 205 provides core bending stiffness and shape recovery force for the rod body 2. This design ensures that the rod body 2 stably maintains its curved rod structure even at a stationary state or under the action of a slight external force (such as operational disturbance or accidental contact), and prevents excessive deformation.

In summary, the internal elastic support rod 205 achieves effective control over overall softness and hardness of the rod body 2. This design not only provides a sufficient supporting force for the originally flexible hollow rod body 2 to maintain its shape, but also ensures that the rod body 2 returns to its original shape after being bent.

Notably, for the rod body 2 with the cavity structure 204, the internal support rod 205 also plays a role in preventing excessive flattening or collapsing of the cavity, and ensures basic structural integrity of the rod body 2.

The support rod 205 may be made of an elastic plastic material, such as nylon or polypropylene, and additionally, the support rod 205 may be installed in different ways:

One is non-fixed installation, that is, the support rod 205 is completely housed within the cavity structure 204 and mainly plays a role of elastic support. The other is fixed installation, that is, the support rod 205 is connected to the base 1, and in this case, a role of reinforcing the connection is additionally played.

Figure 5:
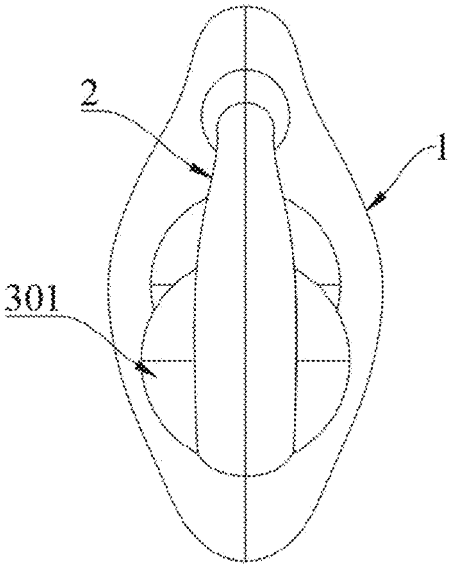
FIG. 5 is a top view of a vibration massager provided by the present disclosure.
Figure 6:
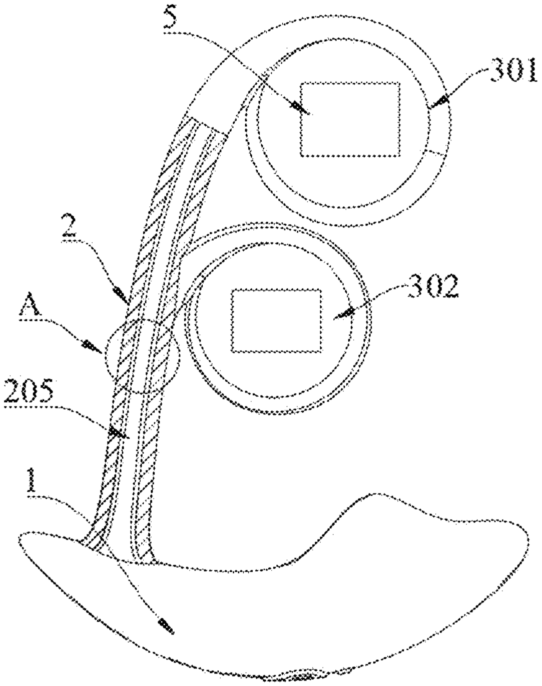
FIG. 6 is a sectional view of a vibration massager provided by the present disclosure.
Figure 7:
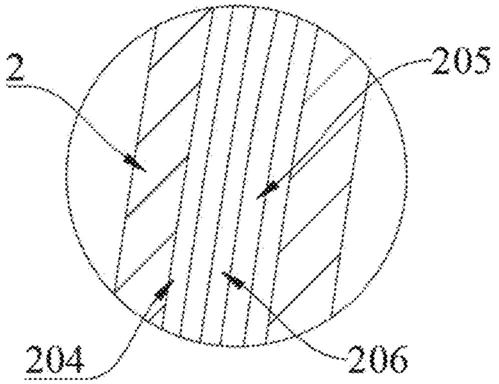
FIG. 7 is a partial enlarged view of a portion A in FIG. 6.

As shown in FIGS. 5 and 6, additionally, the support rod 205 is further provided with a wiring cavity 206.

The base 1 is fixedly connected to the first end portion 201 of the rod body 2 in a fixed connection manner (such as integral forming or adhesive bonding). An outer contour of the base 1 is larger than that of the rod body 2 and presents an asymmetric contour (such as a lip shape). This design provides a gripping area that facilitates stable holding by the user, and the base 1 abuts against an exterior of the body of the user during use, which prevents the massager from accidentally sliding into the body, thereby ensuring the use safety.

Figure 3:
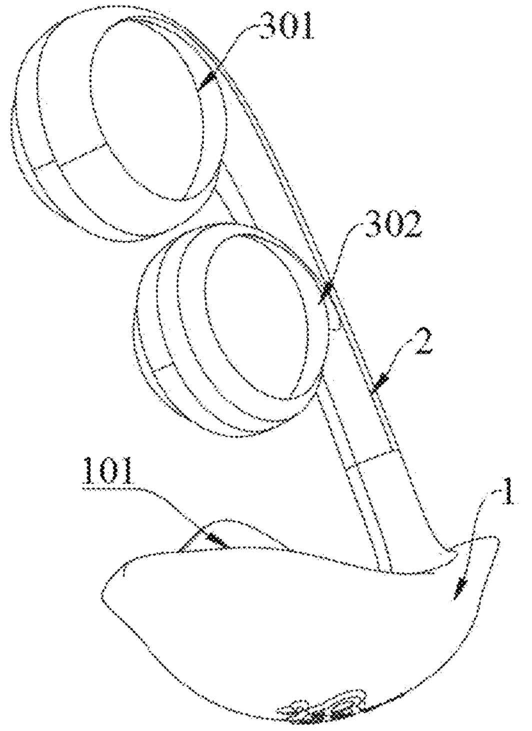
FIG. 3 is a perspective view III of a vibration massager provided by the present disclosure.
Figure 4:
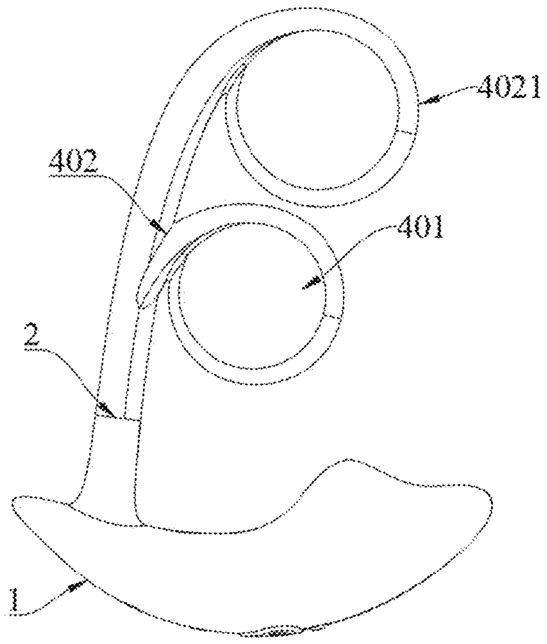
FIG. 4 is a front view of a vibration massager provided by the present disclosure.

As shown in FIGS. 3 and 4, in a specific embodiment, the rod body 2 and the base 1 are connected in an asymmetric manner (or an eccentric connection). Specifically, a connection point of the rod body 2 deviates from a geometric center of the base 1 (such as a center of mass or a center of the outer contour), and is closer to one end or one side edge of the base 1.

In a specific embodiment, an end face of the base 1 facing the stimulation structure is provided with a massage structure 101 configured to perform stimulation massage on an in vitro target massage area (such as an edge portion of a cavity-like area).

The massage structure 101 may be a protrusion, such as one or more independent small convex points, convex grains, strip-shaped convex ridges, or the like additionally disposed on a surface of the end face of the base 1.

The protrusion achieves specific tactile stimulation through the special shape design and arrangement. For example, a plurality of independent small convex points or convex grains are arranged, and these protrusions concentrate the pressure in a small area and provide a concentrated pressing sensation. Alternatively, one or more strip-shaped convex ridges are arranged. When the user moves the massager in a direction of the convex ridges, a continuous pressing or scraping sensation may be generated.

The stimulation structure is located at the distal end of the rod body 2, i.e., the end away from the base 1.

In this embodiment, the stimulation structure is composed of a first stimulation head 301 and a second stimulation head 302 that are both spherical and connected to different positions of the rod body 2. For example, one stimulation head may be located at the distal end of the rod body 2, and the other stimulation head is located in a middle of the rod body 2, and the two stimulation heads are arranged side by side in an axial direction of the rod body 2; or, both the two stimulation heads are located at the distal end thereof but extend in different directions to form a bifurcated structure.

It should be noted that the rod body 2 in this embodiment is different from a rod-shaped main body of a traditional insertable vibration massager. The rod-shaped main body of the traditional insertable vibration massager is mainly used to provide an insertion length and volume, so as to fill a body cavity and achieve the overall stimulation of an inner wall of the cavity-like area through overall insertion and movement.

Specifically, either of the stimulation heads is provided with a massage head 401 and a connecting neck 402. The massage head 401 is configured to directly come into contact with and stimulate the target massage area, and the connecting neck 402 serves to connect the massage head 401 to the rod body 2.

Specifically, either of the massage heads 401 presents a spherical contour, and an outer surface thereof is free of sharp edges or textures to ensure smoothness during contact.

A diameter of the massage head 401 is a settable parameter, and sizes of the two massage heads may be the same or specific differences may exist in the sizes (for example, diameters of the two massage heads may be 20 mm and 18 mm respectively).

Additionally, cross-sectional areas of the first stimulation head 301 and the second stimulation head 302 are larger than a cross-sectional area of the rod body 2. That is to say, the first stimulation head 301 and the second stimulation head 302 occupy a larger contact area or contact space in the target massage area, to achieve more sufficient vibration transmission and more comprehensive stimulation coverage, and the rod body 2 is more focused on achieving connection and installation.

Alternatively, in a specific embodiment, a circumferential surface of the massage head 401 is provided with a stimulation protrusion. A plurality of stimulation protrusions may be arranged, and heights thereof may range from 1 mm to 5 mm, to increase a friction force during massage and disperse a single contact pressure onto a plurality of stimulation points.

In a specific embodiment, a diameter of either of the stimulation heads ranges from 10 mm to 35 mm.

The connecting neck 402 has an arc-shaped beam structure, one end thereof is connected to the distal end of the rod body 2, and the other end thereof is connected to a surface of the massage head 401.

In a specific embodiment, the first stimulation head 301 and the second stimulation head 302 present an inward-rolled shape. Specifically, the first stimulation head 301 is taken as an example. The connecting neck 402 of the first stimulation head 301 is formed by extending the second end portion 202 of the rod body 2, and an extension segment 4021 forms the connecting neck 402 of the first stimulation head 301.

Additionally, when the vibration massager is inserted into the body of the user, the two stimulation heads integrally undergo minor displacement toward the base 1 along an axis of the rod body 2, thereby effectively reducing a resistance during initial contact and insertion.

In a specific embodiment, the extension segment 4021 is integrally formed with a circumferential wall surface of the massage head 401, and the extension segment 4021 protrudes from the circumferential wall surface of the massage head 401, to increase an area of connection with the massage head 401 and further enhance the connection strength.

Inside the stimulation structure, i.e., in the first stimulation head 301 and the second stimulation head 302, at least one vibration device 5 (such as a vibration motor) is accommodated. The vibration device 5 is connected to an internal power supply such as a rechargeable battery accommodated in the base 1 or the rod body 2 and an electronic control module, and the user controls the start, stop, and switching of vibration modes and intensities of the vibration device 5 through a button on the base 1 or any other manner (such as APP control, voice control, or the like).

Based on this, in an embodiment, the vibration device 5 is disposed only in one of the stimulation heads, to achieve stimulation massage from a single vibration source.

Alternatively, in another embodiment, both the first stimulation head 301 and the second stimulation head 302 are internally provided with the vibration device 5. For example, a first vibration device 501 is disposed in the first stimulation head 301, and a second vibration device 502 is disposed in the second stimulation head 302. Thus, the first vibration device 501 located in the first stimulation head 301 and the second vibration device 502 located in the second stimulation head 302 vibrate independently or synergistically. The dual and independently adjustable vibration system enables the vibration massager of this embodiment to provide a highly diversified, customizable and hierarchical vibration stimulation experience (i.e., achieving independent control of two vibration modes and various predetermined combinations, and allowing the user to define a frequency, amplitude and start-stop timing of each vibration device through an electronic device), which is far superior to a single vibration source or two synchronous vibration sources in the vibration effect.

Based on the above two embodiments, since the first stimulation head 301 and the second stimulation head 302 with a spherical structure come into contact with the target massage area (especially the cavity-like area), and a spherical contact surface is formed, which, compared with a contact end with a sharp point, prevents localized pressure concentration caused by sharp points or edges, and ensures softer and safer stimulation. Additionally, mechanical vibration energy generated by the internal vibration device 5 is evenly transmitted through the spherical surface, thereby preventing the concentration or attenuation of vibration energy caused by edges and corners or an asymmetric shape.

Both the first stimulation head 301 and the second stimulation head 302 have a certain degree of mobility. Specifically, when the first stimulation head 301 and the second stimulation head 302 are in contact with an inner cavity wall of the cavity-like area and are subjected to a non-axial contact force (such as a lateral pressure generated by body movement or muscle contraction), the two stimulation heads are not rigidly fixed, but may tilt and swing slightly at a connection point therebetween.

In an embodiment, the first stimulation head 301 and the second stimulation head 302 are allowed to deflect within a conical space of +5 degrees from their central positions.

Figure 8:
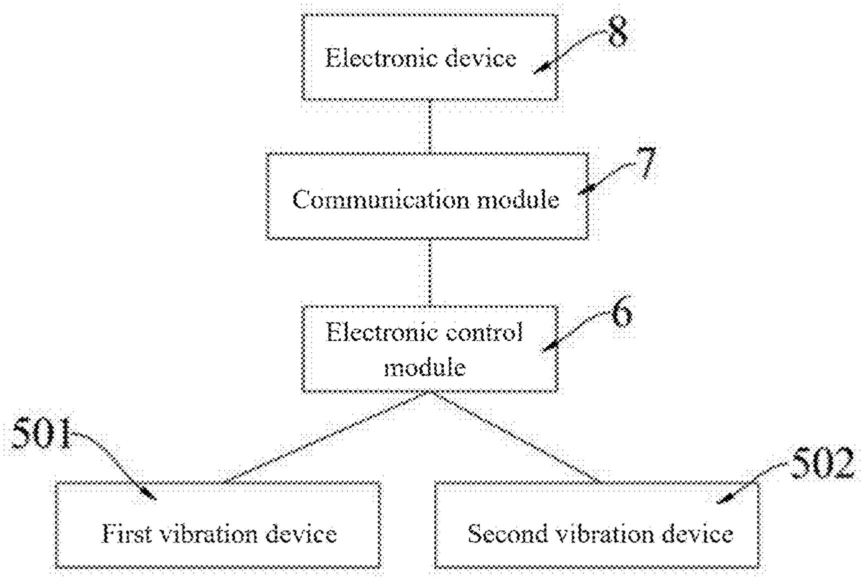
FIG. 8 is a schematic diagram of modules of a vibration massager provided by the present disclosure.

As shown in FIG. 8, in a specific embodiment, the vibration massager further includes an electronic control module 6 electrically connected or signal-connected to the first vibration device 501 and/or the second vibration device 502 to independently control vibration parameters of the two vibration devices.

The vibration parameters include: start or stop, a vibration intensity, and a vibration frequency.

Specifically, when both the first vibration device 501 and the second vibration device 502 exist:

For example, in one use scenario, the electronic control module 6 controls the first vibration device 501 to start vibrating and the second vibration device 502 to stop vibrating, and the two vibration devices alternately start or stop vibrating, to form an intermittent alternating pulse stimulation effect.

Alternatively, in another use scenario, the electronic control module 6 controls vibration intensity changes of the first vibration device 501 and the second vibration device 502. For example, the vibration intensity of the first vibration device 501 is relatively high, and the vibration intensity of the second vibration device 502 is relatively low. For another example, the vibration intensities of the first vibration device 501 and the second vibration device 502 alternately increase or decrease. Specifically, when the vibration intensity of the first vibration device 501 gradually increases from a low level, the vibration intensity of the second vibration device 502 synchronously gradually decreases from a high level, and vice versa.

Furthermore, in another use scenario, the electronic control module 6 controls vibration frequency changes of the first vibration device 501 and the second vibration device 502. For example, the vibration frequency of the first vibration device 501 is relatively high, and the vibration frequency of the second vibration device 502 is relatively low. For another example, the vibration frequencies of the first vibration device 501 and the second vibration device 502 alternately increase or decrease. Specifically, when the vibration frequency of the first vibration device 501 gradually increases from a low level, the vibration frequency of the second vibration device 502 synchronously gradually decreases from a high level, and vice versa.

Specifically, when one of the vibration devices 5 exists, for example, when only the first vibration device 501 is installed:

In one use scenario, the electronic control module 6 controls the first vibration device 501 to vibrate intermittently or continuously, or to vibrate with a constantly changing vibration intensity or vibration frequency, so as to provide a diversified massage experience from a single vibration source.

In another specific embodiment, the vibration massager includes a communication module 7 that may be connected to an external electronic device 8. For example, the communication module 7 may be in communication connection with the user's computing device with the communication function, such as a smartphone, a tablet computer or a personal computer.

For example, the communication module 7 may be a wireless communication module such as a Bluetooth communication module, a Wi-Fi communication module, or a near-field communication (NFC) module.

The Bluetooth communication module (especially Bluetooth Low Energy (BLE)) is preferred in this embodiment due to the characteristics of low power consumption and convenient pairing, and is suitable for continuous data exchange over a short distance. The Wi-Fi communication module achieves a longer connection distance and the possibility of remote control through the Internet, and is suitable for scenarios requiring the remote operation. The NFC module may be used to simplify the process of establishing an initial connection, and for example, and "gentle contact" between the smartphone and the vibration massager enables to quickly trigger an application and the pairing of Bluetooth or Wi-Fi.

In this case, the electronic control module 6 independently controls the vibration parameters of the first vibration device 501 and/or the second vibration device 502 according to an audio signal received by the communication module 7.

For example, in one use scenario, the audio signal may be an audio file stored locally in the electronic device 8 and/or a network streaming audio received and played by an application program.

Specifically, taking the case where both the first vibration device 501 and the second vibration device 502 are installed as an example, when the user plays a piece of music or a video in the electronic device 8, the electronic control module 6 controls the vibration parameters of the first vibration device 501 and the second vibration device 502 according to an amplitude or frequency characteristic of the audio signal of the piece of music or the video. The amplitude refers to the loudness or volume of a sound, and the frequency refers to a pitch or tone of the sound. For example, when the volume or tone of the sound of the music or the video increases, the vibration amplitudes of the first vibration device 501 and the second vibration device 502 increase synchronously, and vice versa. For example, when the volume or tone of the sound of the music or the video increases, the vibration frequencies of the first vibration device 501 and the second vibration device 502 increase synchronously, and vice versa.

For example, in another use scenario, the audio signal may be an audio input collected by a microphone of the electronic device 8 in real time, and the audio input includes a voice of the user.

Specifically, when the volume or tone of a voice emitted by the user increases during use of the massager, the vibration amplitudes of the first vibration device 501 and the second vibration device 502 increase synchronously, and vice versa. Alternatively, when the volume or tone of a voice emitted by the user increases during use of the massager, the vibration frequencies of the first vibration device 501 and the second vibration device 502 increase synchronously, and vice versa.

In summary, by arranging the first vibration device 501 and the second vibration device 502 and performing independent control through the electronic control module 6, the present disclosure breaks through the traditional single-point vibration limitation, and converts a single and repeated mechanical vibration into a multi-level dynamic tactile feedback through the independent control of the dual vibration devices, thereby enhancing the experience of stimulation massage.

In a preferred embodiment, any other device (such as a non-vibration device) are included, and the other device may be disposed in the first stimulation head 301 and the second stimulation head 302, or independently disposed in one of the stimulation heads. The other device is intended to provide additional functions other than vibration, and specifically the following types may be included:

For example, the other device is a counterweight ball. A weight, moment of inertia, and overall center of gravity of the stimulation head may be changed by arranging a counterweight ball with a specific mass (such as a Kegel ball) in the stimulation head.

Alternatively, the other device is a sensor, such as a pressure sensor configured to detect a pressure of contact between the stimulation head and the body of the user in real time; a temperature sensor configured to monitor a body surface temperature of the contact area; and an electromyographic sensor configured to detect muscle contraction activities, which is especially suitable for biofeedback training in cooperation with Kegel exercises.

Additionally, the other device is a miniature camera configured to perform internal image recording.

Alternatively, the other device is a heat conduction unit, i.e., a built-in heater, and is configured to achieve controllable thermal stimulation or thermal therapy.

Alternatively, the other device is an electrical stimulation unit configured to generate a micro current so as to achieve contraction stimulation (such as Electrical Muscle Stimulation (EMS)) at the muscle level.

Alternatively, the other device is a liquid release system that releases lubricating liquid or other functional liquids on demand through a built-in micro pump or a pressable liquid storage sac.

In the description of the embodiments of the present disclosure, it should be noted that, unless otherwise explicitly specified and defined, the terms “mounting”, “connecting”, “connection” and “assembly” should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that “-” and “~” represent the same range of two numerical values, and the range includes end values thereof, for example, “A-B” means a range greater than or equaling to A and less than or equaling to B. “A~B” means a range greater than or equaling to A and less than or equaling to B.

In the description of the embodiments of the present disclosure, the term “and/or” represents merely an association relationship describing associated objects, indicating that there may be three types of relationships, for example, A and/or B, which means three types of situation, that is, the existence of A alone, the existence of both A and B, and the existence of B alone. In addition, the character “/” herein generally indicates that the associated objects are in an “or” relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A vibration massager insertable into a target massage area, comprising:

a rod body;

wherein the rod body is connected to a first stimulation head and a second stimulation head, wherein both the first stimulation head and the second stimulation head are spherical bodies and configured to massage an internal cavity of a human body;

cross-sectional areas of the first stimulation head and the second stimulation head are larger than a cross-sectional area of the rod body; and the first stimulation head is provided with a first vibration device located in the first stimulation head and/or the second stimulation head is provided with a second vibration device located in the second stimulation head;

a base connected to the rod body, wherein an end face of the base connected to the rod body is provided with a massage structure configured to perform stimulation massage on an in vitro target massage area.

2. The vibration massager according to claim 1, wherein either of the stimulation heads comprises:

a massage head, and a connecting neck configured to connect the massage head and the rod body;

wherein the connecting neck is made of an elastic material.

3. The vibration massager according to claim 2, wherein the connecting neck is provided with an extension segment along a circumferential wall surface of the massage head, and the extension segment is integrally formed with the circumferential wall surface of the massage head.

4. The vibration massager according to claim 3, wherein the extension segment protrudes from the circumferential wall surface of the massage head.

5. The vibration massager according to claim 1, wherein diameters of the first stimulation head and the second stimulation head range from 10 mm to 35 mm.

6. The vibration massager according to claim 1, wherein a maximum cross-sectional dimension of the rod body ranges from 5 mm to 30 mm.

7. The vibration massager according to claim 1, wherein the rod body is provided with a cavity; and and an elastic support member is disposed in the cavity.

8. The vibration massager according to claim 1, wherein the rod body is a straight rod or a curved rod.

9. The vibration massager according to claim 1, wherein the massage structure is a massage protrusion protruding from the end face of the base.

10. The vibration massager according to claim 1, wherein a length of the rod body ranges from 80 mm to 150 mm.

11. The vibration massager according to claim 1, wherein the base is in a ship shape or a lip shape.

12. The vibration massager according to claim 1, wherein circumferential wall surfaces of the first stimulation head and the second stimulation head are provided with:

stimulation protrusions, wherein the stimulation protrusions protrude from the circumferential wall surfaces of the first stimulation head and the second stimulation head.

13. The vibration massager according to claim 1, wherein the rod body is provided with:

a first end portion and a second end portion;

wherein the first end portion is connected to the base in an integrally formed manner; and wherein the second end portion is connected to the first stimulation head and forms the connecting neck of the first stimulation head.

14. The vibration massager according to claim 1, comprising:

an electronic control module, electrically connected to the first vibration device located in the first stimulation head and/or the second vibration device located in the second stimulation head;

wherein the electronic control module is configured to independently control at least one vibration parameter of the first vibration device and/or the second vibration device;

the vibration parameter comprises: start or stop, a vibration intensity, and a vibration frequency.

15. The vibration massager according to claim 14, comprising:

a communication module, configured to establish a wireless communication connection with an electronic device and receive an audio signal sent by the electronic device;

wherein the electronic control module is configured to respond to the audio signal so as to independently control the at least one vibration parameter of the first vibration device and/or the second vibration device; and the vibration parameter comprises: start or stop, a vibration intensity, and a vibration frequency.

16. The vibration massager according to claim 15, wherein when the first stimulation head is provided with the first vibration device and the second stimulation head is provided with the second vibration device, the electronic control module controls the first vibration device and the second vibration device to perform alternate vibrations according to a rhythm of the audio signal.

17. The vibration massager according to claim 15, wherein the audio signal comprises:

an audio file stored locally in the electronic device;

and/or a network streaming audio received and played by an application program.

18. The vibration massager according to claim 15, wherein the audio signal comprises an audio input collected by a microphone of the electronic device in real time, and the audio input comprises a voice of the user.

* * * * *